(12) United States Patent
Kuroda et al.

(10) Patent No.: US 7,673,502 B2
(45) Date of Patent: Mar. 9, 2010

(54) INSPECTION OF A CONTINUOUSLY VARIABLE TRANSMISSION BELT MEMBER

(75) Inventors: Hiroaki Kuroda, Mishima (JP); Makoto Momoi, Ayase (JP); Masanori Taguchi, Takasaki (JP); Eiichiro Muramatsu, Fuji (JP)

(73) Assignee: JATCO Ltd, Fuji-shi (JP)

( * ) Notice: Subject to any disclaimer, the term of this patent is extended or adjusted under 35 U.S.C. 154(b) by 1416 days.

(21) Appl. No.: 11/062,485

(22) Filed: Feb. 23, 2005

(65) Prior Publication Data

US 2005/0192147 A1 Sep. 1, 2005

(30) Foreign Application Priority Data

Mar. 1, 2004 (JP) .............................. 2004-056019

(51) Int. Cl.
*G01B 5/28* (2006.01)
(52) U.S. Cl. ...................................... 73/105; 356/237.2
(58) Field of Classification Search ............ 73/862.453, 73/105, 785, 800; 356/237.2, 237.3, 243.4, 356/243.7; 474/201; 33/1 BB, 719
See application file for complete search history.

(56) References Cited

U.S. PATENT DOCUMENTS

| | | | | |
|---|---|---|---|---|
| 4,385,522 | A * | 5/1983 | Mittleman | 73/105 |
| 5,231,675 | A * | 7/1993 | Sarr et al. | 356/243.4 |
| 5,650,022 | A * | 7/1997 | Kitano et al. | 148/228 |
| 6,166,393 | A * | 12/2000 | Paul et al. | 250/559.08 |
| 6,609,403 | B2 | 8/2003 | Mitsubayashi et al. | |
| 6,733,600 | B2 * | 5/2004 | Heishi et al. | 148/230 |
| 6,779,414 | B2 * | 8/2004 | Shori et al. | 73/865.9 |
| 6,970,238 | B2 * | 11/2005 | Gerhard et al. | 356/237.4 |
| 7,105,848 | B2 * | 9/2006 | Guha et al. | 356/237.1 |
| 7,298,470 | B2 * | 11/2007 | Tange | 356/237.2 |
| 2002/0132691 | A1 * | 9/2002 | Pennings et al. | 474/242 |
| 2003/0045387 | A1 | 3/2003 | Ishii et al. | |

(Continued)

FOREIGN PATENT DOCUMENTS

DE 101 37 608 A1 3/2002

(Continued)

OTHER PUBLICATIONS

"distance". (1992). In Academic Press Dictionary of Science and Technology.*

(Continued)

*Primary Examiner*—Lisa M Caputo
*Assistant Examiner*—Punam Patel
(74) *Attorney, Agent, or Firm*—Foley & Lardner LLP

(57) ABSTRACT

A belt (3) of a continuously variable transmission comprises a pair of endless rings (2a) and plural elements (1) held between the pair of endless rings (2a). The endless rings (2) are formed of plural laminated thin plates (2a). A prestress in a compression direction is applied beforehand to the surfaces of the thin plates (2a) by a nitriding treatment. In this process, a defect part (2b) is formed as a hollow in the thin plate (2a) due to scatter in the nitriding treatment. This invention measures the depth of the defect part (2b), and if the measured depth exceeds a predetermined tolerance value, it is determined that the prestress is insufficient. Due to this determination method, a highly precise inspection of the thin plates (2a) forming the endless rings (2) can be performed in a short time.

2 Claims, 5 Drawing Sheets

U.S. PATENT DOCUMENTS

2004/0238073 A1* 12/2004 Ishii et al. .................. 148/217
2005/0009658 A1 1/2005 Fichtinger et al.

FOREIGN PATENT DOCUMENTS

| DE | 101 59 568 A1 | 6/2003 |
| JP | 2000-087214 A | 3/2000 |
| JP | 1 055 738 A2 | 11/2000 |
| JP | 1 094 242 A1 | 4/2001 |
| JP | 1 369 618 A2 | 12/2003 |

OTHER PUBLICATIONS

R. Payling, P. Chapon, K. Shimizu, R. Passetemps, A. Jadin, Y. Bourgeois, K. Crener, M. Aeberhard, J. Michler. "Surfaces, Thin Films and Coatings." Glow Discharge Plasmas in Analytical Spectroscopy. Ed. R.K. Marcus & J.A.C. Borekaert. John Wiley & Sons, 2003.*

Pye, David. "Practical Nitriding and Ferritic Nitrocarburizing". ASM International. 2003. p. 185.*

H. E. Evans, D. A. Hilton, R. A. Holm, S. J. Webster. "The Development of Localized Pits During Stainless Steel Oxidation." Oxidation of Metals, vol. 14, No. 3. 1980. pp. 235-247.*

* cited by examiner

INSPECTION OF A CONTINUOUSLY VARIABLE TRANSMISSION BELT MEMBER

FIELD OF THE INVENTION

This invention relates to a method of inspecting a belt member used in a belt type continuously variable transmission which transmits a torque via a belt.

BACKGROUND OF THE INVENTION

A belt for a belt type continuously variable transmission comprises plural elements supported between a pair of endless rings. The endless rings are formed by laminated thin plates. When the continuously variable transmission is running, a tensile force and a bending moment act on the belt which transmits the torque. As the endless rings have to bear these loads, a large tensile stress occurs on the outer circumferences of the endless rings.

JP2000-087214 published by the Japan Patent Office in 2000 proposes giving the surface of the thin plate which forms the endless ring a nitriding treatment for reducing this tensile stress so as to add a prestress in a compression direction. The prestress in the compression direction has the effect of eliminating the tensile stress which is produced when the belt is used. Therefore, in this prior art, the load borne by the endless rings when torque is transmitted can be reduced, and the fatigue strength of the belt can be improved.

SUMMARY OF THE INVENTION

In a step prior to the nitriding treatment for adding a prestress, the steel plate which forms the endless ring is washed. If any detergent used for this washing process remains, a prestressed nitride layer will not be fully formed in that part in the nitride treatment stage. As a result, a local scatter arises in the prestress, and it becomes difficult to improve the belt durability.

The parts where the nitride layer is not properly formed can be found to some extent by visual inspection. In the prior art, a part where a defect is suspected was first visually inspected, and the corresponding site was then inspected with an X-ray diffraction device to attempt to maintain stable belt quality.

However, inspection by the X-ray diffraction device requires an inspection time of an hour or more per site. This inspection time is too long to be used on a mass production line. If all the members considered suspect in the visual inspection are discarded, on the other hand, inspection by an X-ray diffraction device may be omitted.

If this is done, however, the yield of material would be adversely affected, and the production cost of the belt would increase.

It is therefore an object of this invention to perform an inspection of a belt for continuously variable transmissions which has been prestressed by nitriding treatment with good precision in a short time.

In order to achieve the above object, this invention provides a method for inspecting a belt of a continuously variable transmission comprising an endless ring comprising a thin plate which bears a prestress in a compression direction due to nitriding treatment. The method comprises measuring a depth of a suspected part formed as a hollow due to incomplete nitriding treatment in a thin plate, comparing the measured depth with a predetermined tolerance value, and determining that the prestress is insufficient when the measured depth exceeds the tolerance value.

The details as well as other features and advantages of this invention are set forth in the remainder of the specification and are shown in the accompanying drawings.

DESCRIPTION OF THE PREFERRED EMBODIMENTS

Figure 1:
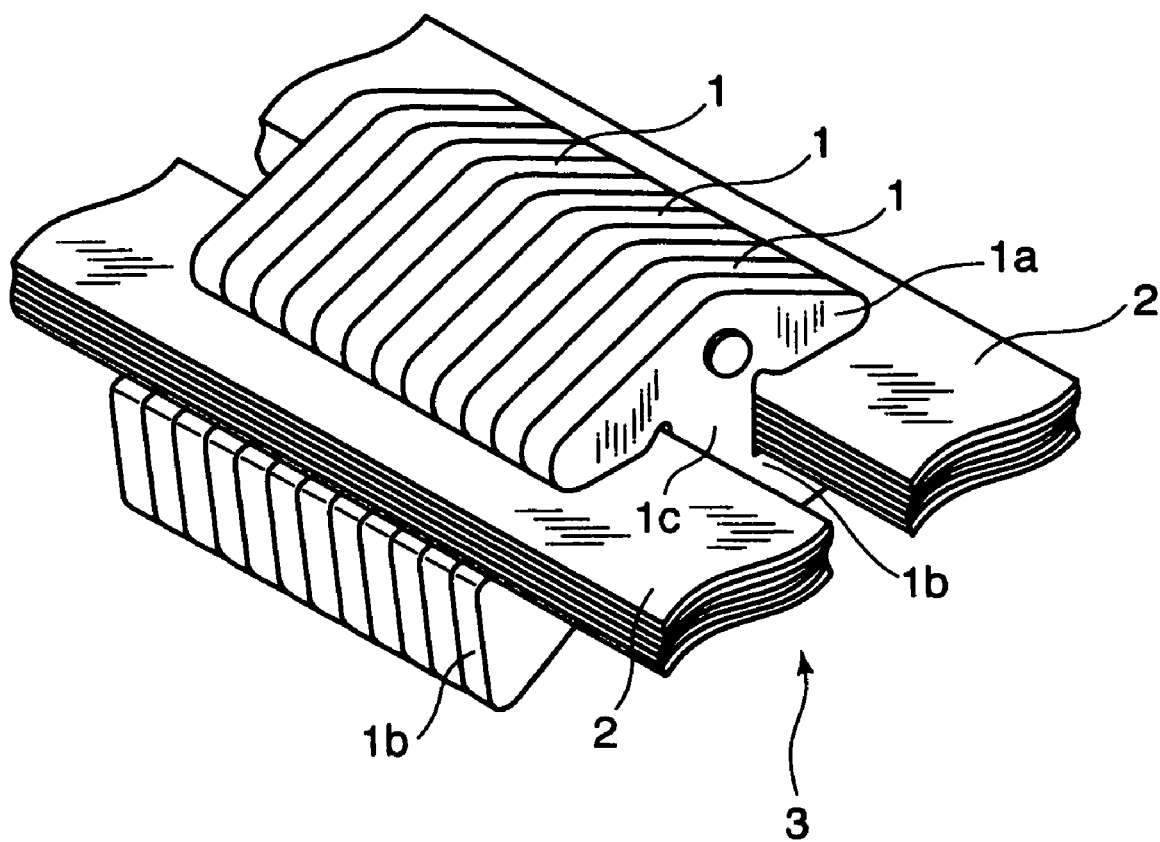
FIG. 1 is an enlarged perspective view of the essential parts of a belt for a belt type continuously variable transmission.

Referring to FIG. 1 of the drawings, a belt 3 of a belt type continuously variable transmission comprises a laminate of plural elements 1, normally about 400, and a pair of endless rings 2 joining the laminate so as to form an annular belt.

Figure 2:
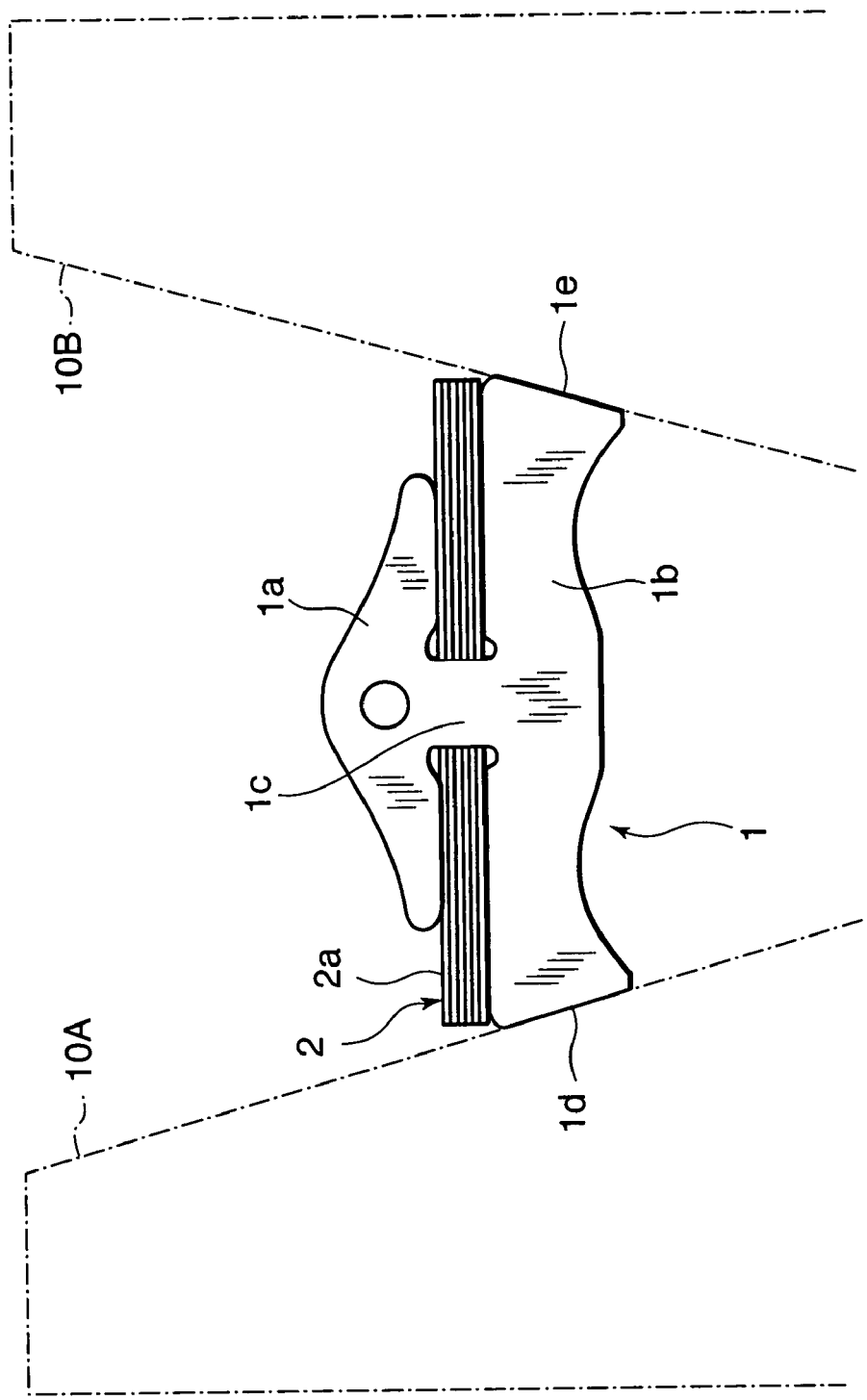
FIG. 2 is an enlarged vertical cross-sectional view of the essential parts of the belt.

Referring to FIG. 2, the belt 3 fits into a V-shaped annular groove formed by facing conical plates 10A, 10B of a belt pulley of the continuously variable transmission.

The continuously variable transmission comprises two such belt pulleys, the belt 3 being looped around the two belt pulleys.

The element 1 comprises a head 1a, a body 1b having two sides 1d, 1e in contact with the input/output belt pulleys of the continuously variable transmission, and a neck 1c connecting the head 1a and body 1b. When it fits into the V-shaped annular groove between the conical plates 10A, 10B, one side 1d of the body 1b comes in contact with the conical plate 10A, and the other side 1e of the body 1b comes in contact with the conical plate 10B.

The endless ring 2 is formed by a predetermined number of laminated steel thin plates 2a. The pair of endless rings 2 respectively fit into slots formed by the head 1a and body 1b on both sides of the neck 1c. The endless rings 2 are formed in an unbroken circle, and when the pair of endless rings 2 fits into the slots on both sides of the neck 1c of all the elements 1, it forms a belt of V-shaped cross-section.

A prestress is made to act on the surfaces of the thin plates 2a forming the endless rings 2 beforehand by performing nitriding treatment as described hereinabove. During operation of the continuously variable transmission, a strong tensile stress acts on the belt 3. Thus, by adding the prestress in the compression direction to the surfaces of the thin plates 2a beforehand, the tensile stress generated on the surfaces of the thin plates 2a during operation of the continuously variable transmission is reduced, which has a desirable effect on the durability of the belt 3.

Figure 3:
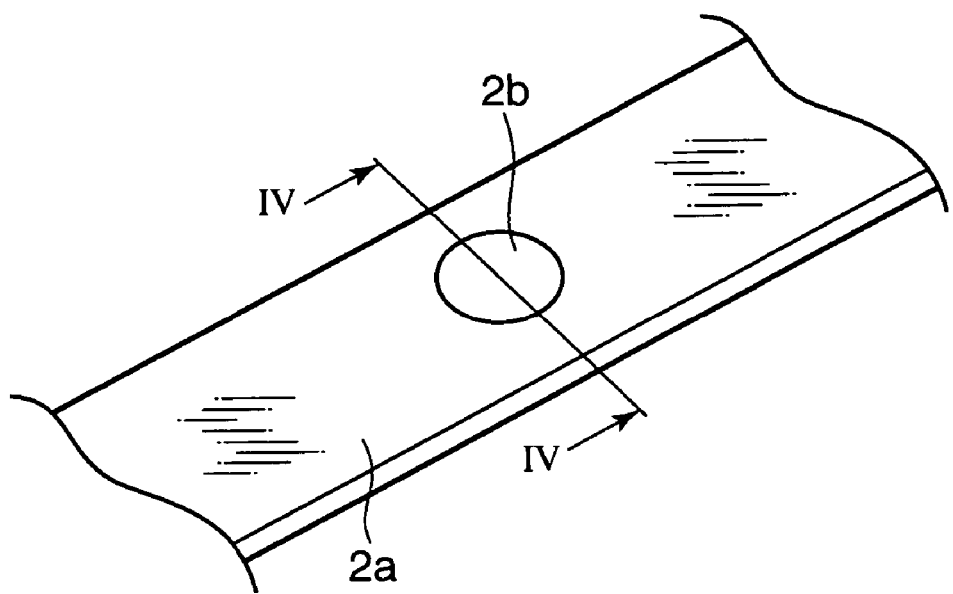
FIG. 3 is an enlarged perspective view of the essential parts of a ring used for the belt.

Referring to FIG. 3, in the washing of the thin plate 2a performed prior to the nitriding treatment step, if detergent remains on the surface, non-uniformity will occur in the subsequent nitriding treatment and a defect-suspected part 2b wherein the nitride layer is not fully formed will be produced. This defect-suspected part 2b differs in hue from a properly formed nitride layer, and can be recognized visually.

This invention provides an inspection method to determine whether or not the prestress on a defect-suspected part 2b of the thin plate 2a recognized visually in this way is within a tolerance range.

Figure 4:
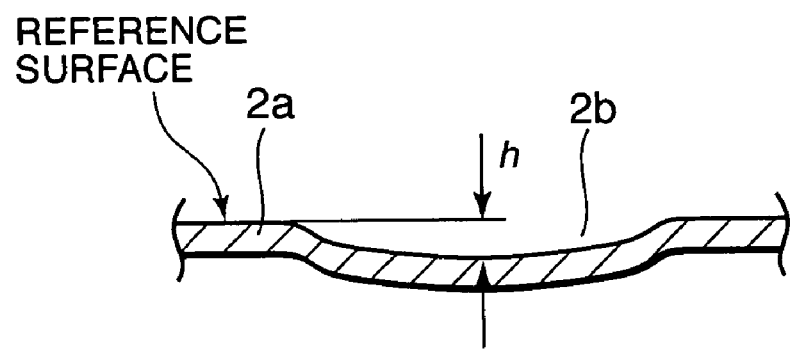
FIG. 4 is a vertical cross-sectional view of the ring taken along a line IV-IV of FIG. 3.

Referring to FIGS. 3 and 4, according to the Inventors' research, the defect-suspected part 2b in which the nitride layer is not fully formed, forms a hollow relative to the surrounding part 2a of the circumference in which the nitride layer was properly formed.

Figure 5:
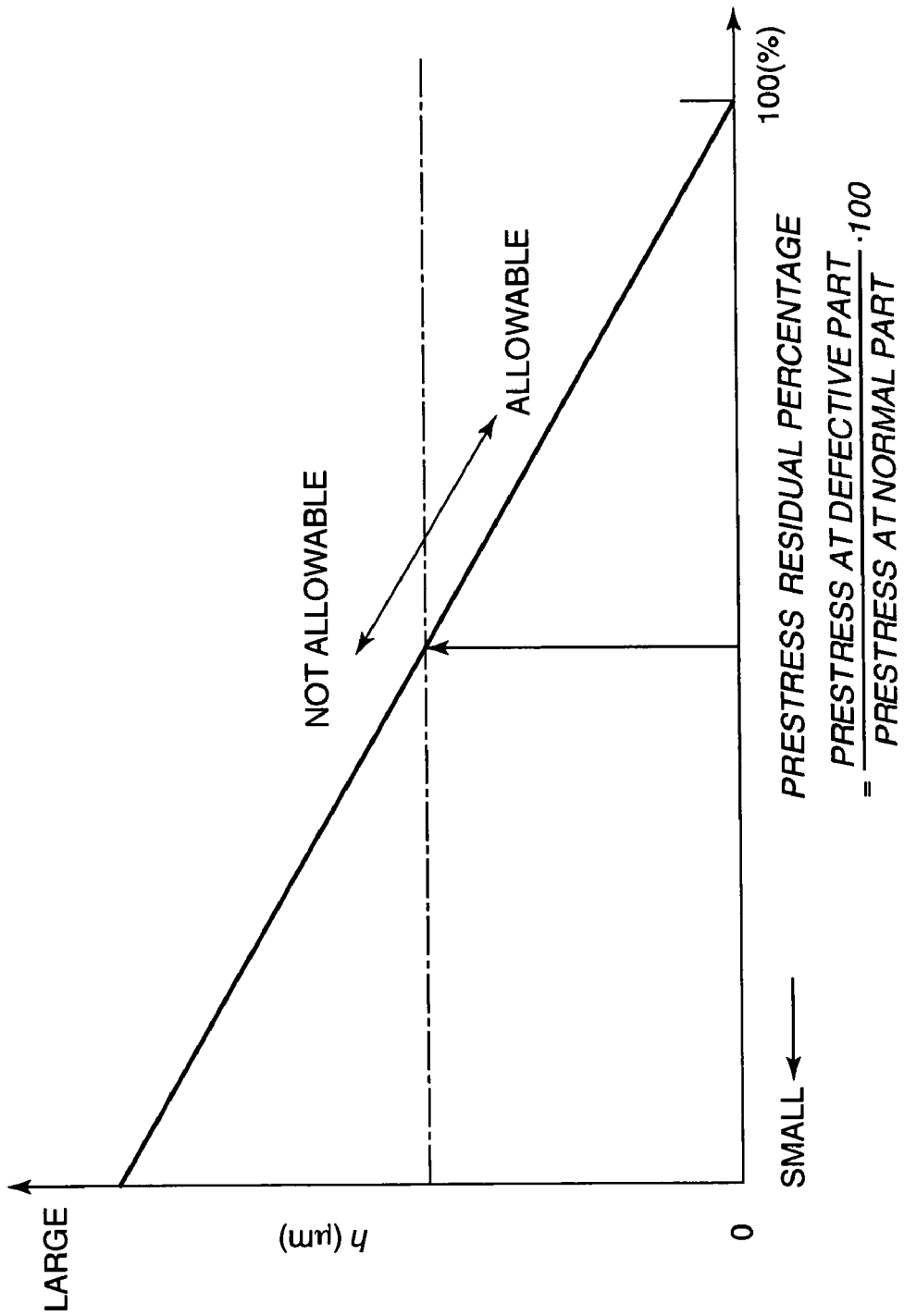
FIG. 5 is a diagram showing a relation between a ring surface hollow depth, and a prestress.

Referring to FIG. 5, the depth h of the hollow increases, as the residual percentage of prestress is lower. Herein, residual percentage means the percentage of prestress of the defect-suspected part 2b relative to the prestress of the part wherein the nitride treatment was properly performed. The nearer the residual percentage was to 100%, the more correctly the nitriding treatment was performed, and if the residual percentage is zero, it shows that no prestress was added at all.

Based on the above research, this invention measures the depth h of this hollow, and if the depth h of the hollow is less than a predetermined tolerance ht, determines that the nitride layer is within tolerance range. The measurement of the depth h of the hollow can be performed using a surface roughness meter. The depth h of the hollow by the surface roughness meter can be measured in about 5 minutes. Therefore, compared with the case where the decreasing rate of prestress is estimated using an X-ray diffraction device, the time required to detect the presence or absence of a defect is much shorter. Moreover, the object of measurement by the surface roughness meter is only the visually defect-suspected part 2b, and it is not necessary to take measurements throughout the endless ring 2. Therefore, there are few steps required for inspection, and the method is adequate for mass production of the belt 3.

Figure 6:
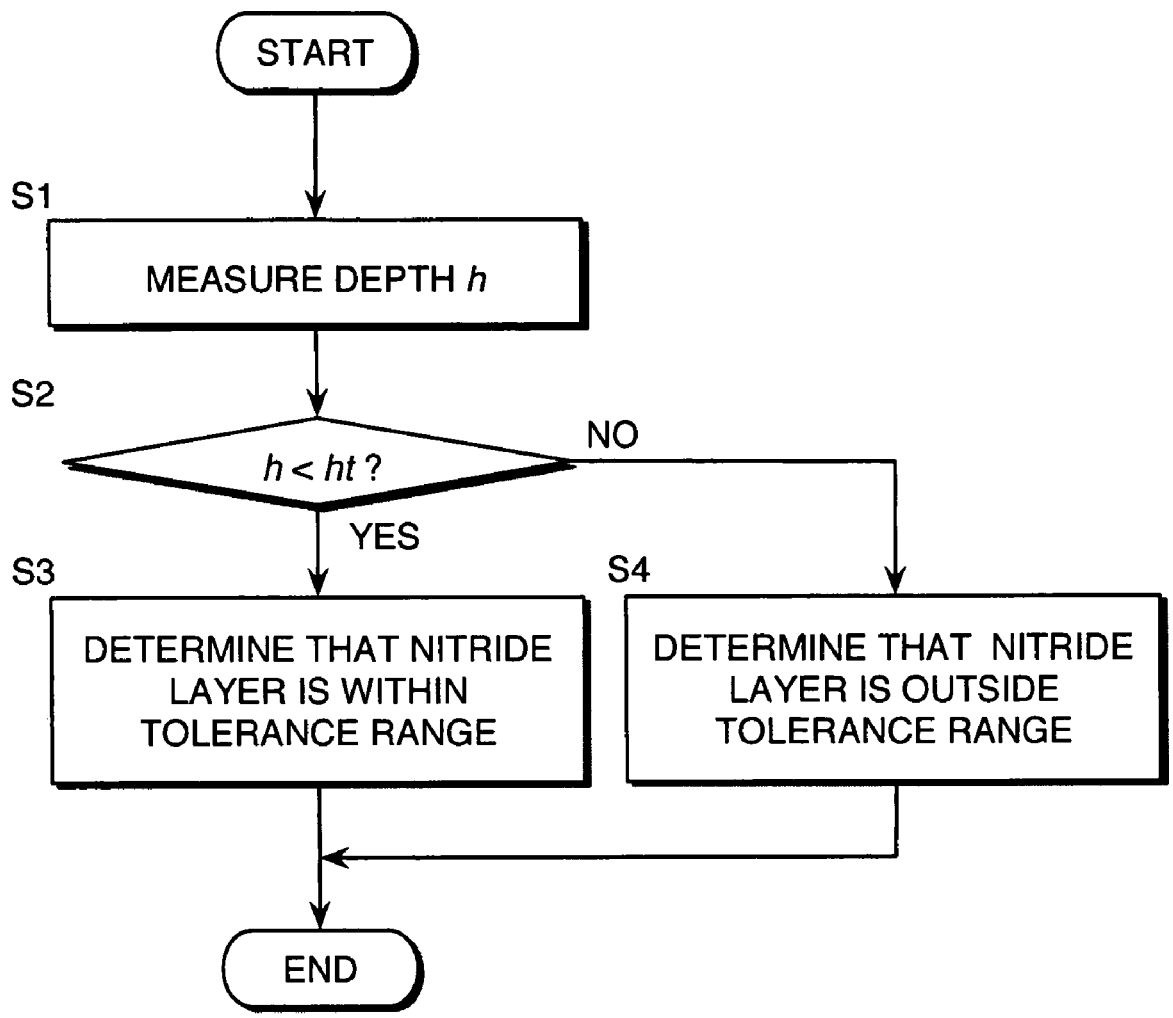
FIG. 6 is a flowchart describing an inspection method according to this invention.

Referring to FIG. 6, the aforesaid inspection process will now be described using a flowchart. In a step S1, the depth h of a defect-suspected part 2b is measured with a surface roughness meter. In a next step S2, the depth h of the defect-suspected part 2b is compared with a tolerance value ht. If the depth h of the defect-suspected part 2b is less than the tolerance value ht in the step S2, it is determined in a step S3 that the nitride layer of the measured part is within a tolerance range. If the depth h of the defect-suspected part 2b is not less than the tolerance value ht in the step S2, it is determined in a step S4 that the nitride layer of the measured part is outside the tolerance range.

In this way, by estimating the prestress load state from the hollow Odepth of the thin plate 2a, the scatter in the prestress state of the thin plate 2a can be determined with good precision in a short time. By applying this inspection method to the manufacture of a belt of a continuously variable transmission, the belt production process can be shortened.

Lastly, the tolerance value ht will be described.

When a torque is transmitted, a tensile force and a bending moment act on the endless rings 2. The bending moment causes a tensile stress to act on the outer circumference and a compressive stress to act on the inner circumference of the thin plates 2a.

If there is no prestress, the tensile stress acting on the outer circumference of the thin plate 2a becomes a critical stress generated in the thin plate 2a. When a prestress in the compression direction is added to the thin plate 2a, the tensile stress generated on the outer circumference side of the thin plate 2a decreases during torque transmission, and the compressive stress generated on the inner circumference side of the thin plate 2a increases.

Therefore, the prestress must be set within a range wherein the compressive stress on the inner circumference side of the plate 2a during torque transmission does not exceed a tolerance stress.

The target value of the prestress set from such a viewpoint corresponds to a residual percentage of 100% in FIG. 5. Herein, the permitted minimum value of the prestress is set to 50% of the target value, and the corresponding hollow depth is set to the tolerance value ht.

The contents of Tokugan 2004-056019, with a filing date of Mar. 1, 2004 in Japan, are hereby incorporated by reference.

Although the invention has been described above by reference to certain embodiments of the invention, the invention is not limited to the embodiments described above. Modifications and variations of the embodiments described above will occur to those skilled in the art, within the scope of the claims.

The embodiments of this invention in which an exclusive property or privilege is claimed are defined as follows:

What is claimed is:

1. A method for inspecting a belt of a continuously variable transmission, the belt comprising an endless ring comprising a thin plate which has undergone a prestress in a compression direction by nitriding treatment, the nitriding treatment, when applied insufficiently, forming a hollow in a surface of the thin plate, the method comprising:

measuring a depth of the hollow in the surface of the thin plate, wherein the hollow has a bottom and the depth of the hollow represents a level difference between a reference surface which has undergone a sufficient prestress and the bottom of the hollow;

determining a target value of the prestress;

determining a permitted minimum value which has a fixed relation to the target value of the prestress;

calculating a prestress difference between the target value of the prestress and the permitted minimum value;

converting the prestress difference into a predetermined tolerance value;

comparing the measured depth of the hollow with the predetermined tolerance value; and determining that the nitriding treatment is insufficient when the measured depth exceeds the predetermined tolerance value.

2. The inspection method as defined in claim 1, wherein the belt further comprises another endless ring to form a pair of endless rings, plural elements which are held between the pair of the endless rings, and a pair of pulleys around which the belt is looped in a state where two sides of the plural elements contact the pulleys, each of the pair of the endless rings is formed of plural laminated thin plates which undergo a tensile stress and a bending moment when the belt transmits a torque between the pair of pulleys.

* * * * *